Patented Oct. 27, 1931

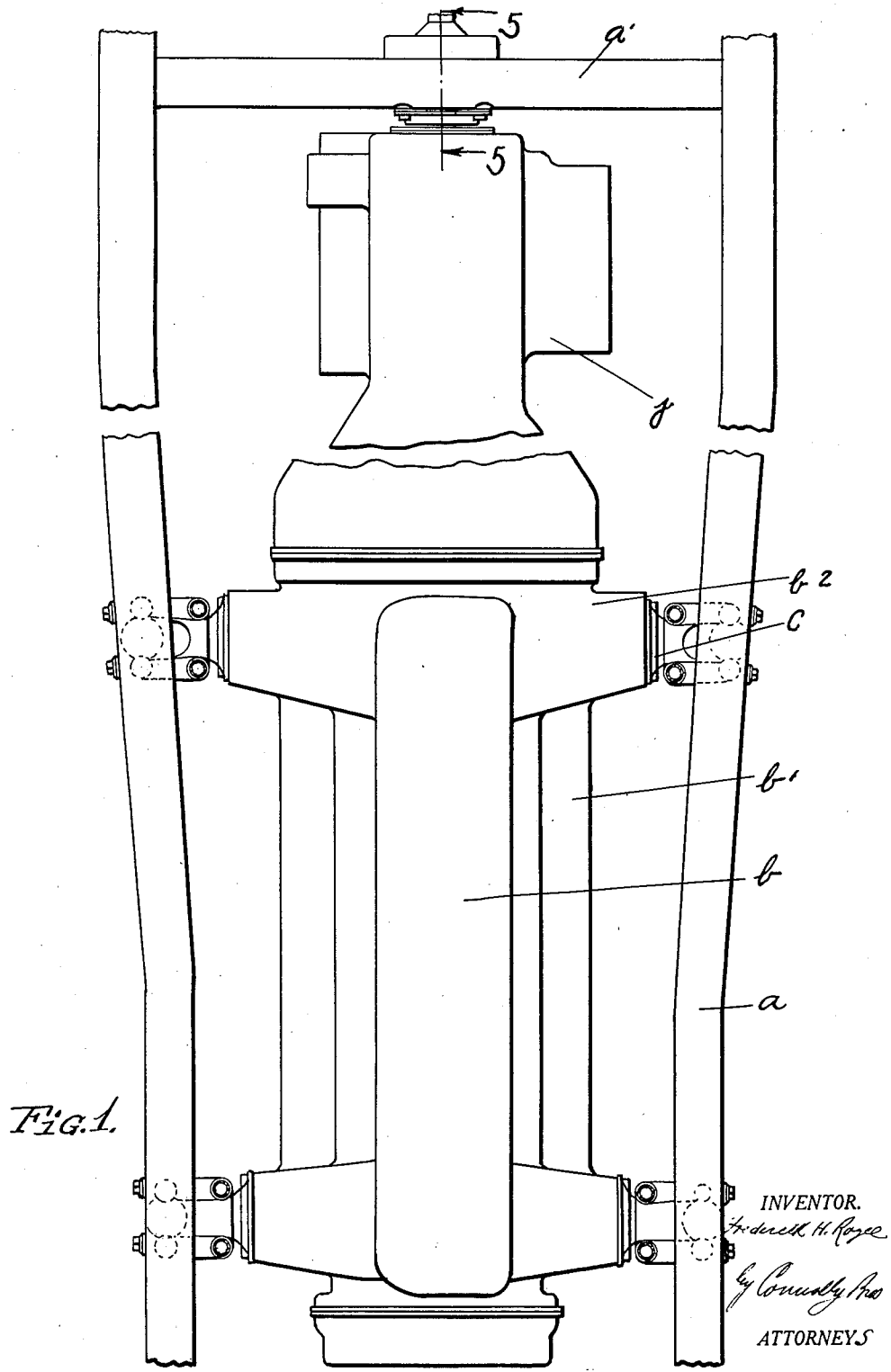

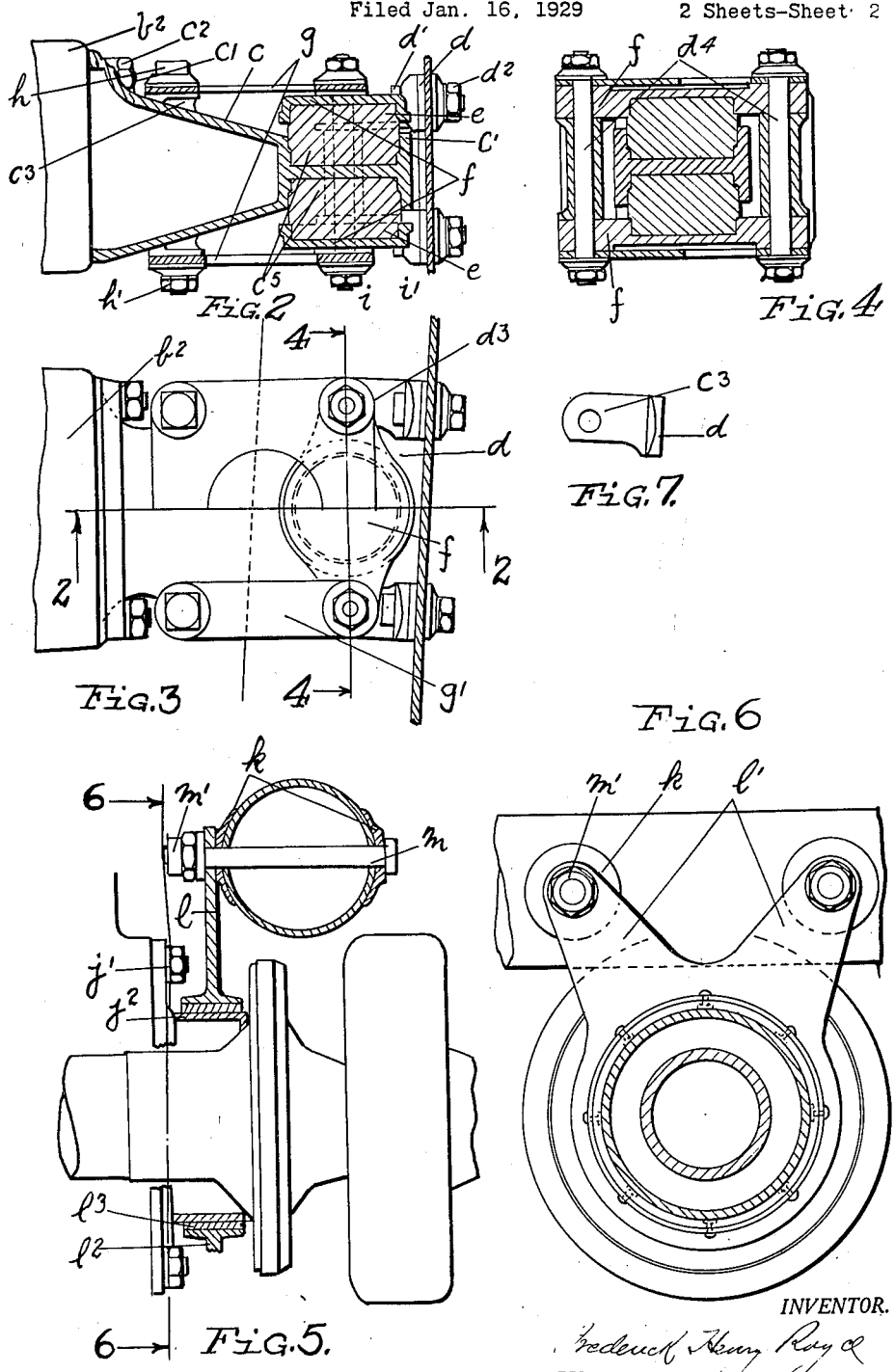

1,829,676

UNITED STATES PATENT OFFICE

FREDERICK HENRY ROYCE, OF ELMSTEAD, WEST WITTERING, NEAR CHICHESTER, ENGLAND, ASSIGNOR TO ROLLS ROYCE LIMITED, OF DERBY, ENGLAND

SUSPENSION OF ENGINES FOR SELF PROPELLED ROAD VEHICLES

Application filed January 16, 1929, Serial No. 332,972, and in Great Britain February 1, 1928.

In self propelled road vehicles such as ordinary motor cars it is necessary or desirable that the suspension of the engine shall be such as to admit of a small amount of torsional resilience relatively to the frame, for the purpose of preventing torsional vibration of the engine from being communicated to the frame, to the discomfort of the passenger and accommodating, without undue strain, any bending of the frame.

Many devices and arrangements have been made to this end with more or less success, but in such devices there has been a loss of horizontal rigidity between the engine and frame.

This invention is a new and improved arrangement to achieve the end referred to.

According to this invention the engine is connected to the frame at suitable points on opposite sides of the engine and these connections are rigid for horizontal movement relatively to the frame under mechanical stress, but resilient for vertical movement.

Preferably some arrangement is made to admit of longitudinal extension of the engine relatively to the frame so as to accommodate for expansion by heat.

As an example of this invention I make apparatus as illustrated in the accompanying drawings.

Fig. 1 is a plan view of an engine and gear box mounted according to my invention, Fig. 2 is a sectional elevation to an enlarged scale of the rear mounting, Fig. 3 is a plan view showing the rear mounting in the top half and the front mounting in the lower half, Fig. 4 is a section on line 4—4 of Fig. 3, Fig. 5 is a section on line 5—5 of Fig. 1, showing the gear box support to an enlarged scale, and Fig. 6 is a sectional view on line 6—6 of Fig. 5. Fig. 7 is a plan view of one pair of the brackets $d$.

$a$ are the side girders of the chassis frame, and $a^1$ a transverse member thereof. $b$ is the engine and $b^1$ the crank shaft case thereof, formed with bosses $b^2$. $c$ are conical brackets secured to bosses $b^2$ by means of studs $c^1$ and nuts $c^2$ having formed thereon perforated bosses $c^3$ and terminating in a horizontal flat part $c^4$, having circular recesses $c^5$ in the upper and lower faces thereof. $d$ is a bracket secured to the girder $a$ by means of bolts $d^1$ and nuts $d^2$, and formed with jaws $d^3$ enveloping the sides of the flat part $c^4$ of the bracket $c$, and having formed at the ends of such jaws respectively perforated bosses $d^4$. $e$ are blocks of india rubber fitting circumferentially in the said circular recesses but projecting for a short distance thereout. $f$ are plates with a central enlarged part extending over the upper and lower ends of the bosses, and having circular recesses in their respective inner faces to receive the projecting ends of the india rubber blocks $e$ and perforations registering the perforations of the bosses $d^4$. Referring to the rear support, $g$ are plates (having a central circular hole therein for lightness) extending over all the bosses $c^3$ and $d^4$ with holes registering with the perforations through such bosses. $h$ are bolts passing through holes in the said plates $g$ and the bosses $c^3$ secured by nuts $h^1$. $i$ are studs threaded at each end passing through holes in the said plates $f$ and $g$ and the bosses $d^4$ and secured at each end by nuts $i^1$. Referring to the front supports in lieu of the plates $g$ there are links $g^1$ with holes therein respectively registering with holes in bosses $c^3$ and $d^4$.

The gear box $j$ which is rigidly secured at its forward end to the crank shaft case is supported at its rear end, so as to enable an amount of rotary movement relative to the chassis frame in manner following: $j^1$ is a plate secured to the rear end of the gear box by means of studs and bolts having projected integral therewith a cylindrical projection $j^2$, co-axial with the shaft. $k$ are two saddle pieces brazed to the sides of the transverse member $a^1$. $l$ is a flat plate formed with perforated ears $l^1$ at the upper end and with a flanged eye $l^2$ at the lower end thereof, embracing the cylindrical projection $j^2$, $l^3$ is a lining composed of suitable fibrous material, between the cylindrical projection $j^2$ and the eye $l^2$, $m$ are bolts passing through perforations in the saddle pieces $k$ and the transverse member $a^1$ and the ears $l^1$ of the plate $l$ secured by nuts $m^1$.

In another form of suspension the engine at the rear is supported by projecting brackets in manner hereinbefore described and at the fore end is supported by means of a transverse member extending from one side girder to the other across the front of the engine with an eyelet in the centre facing the engine and a pivot is projected from the engine extending through the eyelet so that the front of the engine can rock relatively to the side girders and can move longitudinally in such eyelet to allow for expansion due to heat.

What I claim is:—

1. The combination of a self propelled road vehicle having a frame comprising side girders, an engine for propelling the same, and means for mounting the engine on the girders comprising one or more pairs of brackets projected, one on each side, from the engine, each of such brackets terminating in a flat horizontal part with circular recesses on the upper and lower faces thereof, and having formed thereon suitably positioned vertically perforated bosses, a like number of brackets projected from the side girders, each formed with jaws embracing respectively the sides of one of the flat parts of the before mentioned brackets, and having formed at the end of such jaws vertically perforated bosses, suitably shaped blocks of india rubber located in the said recesses, and protruding thereout, suitably shaped metal plates across the outer faces of each of the blocks of india rubber and extending across the jaws of the associated bracket projected from a girder, with perforations registering with the perforations of the said jaws, metal plates extending over the upper and lower ends of the perforated bosses on each of the brackets projected from the engine and the jaws of the associated bracket projected from the girder with perforations corresponding to the perforations in all such bosses, and bolts passing through the perforations of the bosses and the plates and secured therein by nuts.

2. The combination of a self propelled road vehicle having a frame comprising side girders, an engine for propelling the same, and means for mounting the engine on the girders comprising a pair of brackets projected one on each side from the engine, near the front thereof a like pair of brackets near the rear thereof, each of such brackets terminating in a flat horizontal part with circular recesses on the upper and lower faces thereof, and having formed thereon suitably positioned vertically perforated bosses, a bracket projected from the girders corresponding to the brackets projected from the engine, each formed with jaws embracing the sides of the flat part of the associated bracket projected from the engine, and having formed at the end of such jaws vertically perforated bosses, suitably shaped blocks of india rubber located in the said recesses and protruding thereout, suitably shaped metal plates across the outer faces of each of the blocks of india rubber, extending across the associated jaws with perforations corresponding to the perforations of the bosses of such jaws, metal plates extending over the upper ends and lower ends respectively of the perforated bosses of the brackets projected from the engine near the rear end thereof and of the said jaws with perforations corresponding to the perforations of the said bosses, bolts passing through the perforations of such bosses and plates and secured therein by nuts, links extending respectively across the upper and lower faces of each of the bosses of the brackets near the fore end of the engine and the corresponding jaw of the associated bracket extended from a girder with perforations in each of such links corresponding to the perforations through the bosses which it extends over and bolts extending through such bosses, plates and links and secured by nuts.

3. The combination of a self propelled road vehicle having a frame provided with side girders, an engine to propel the same, and means for mounting the engine on the girders consisting of a bracket projected from each side of the engine near the rear thereof, terminating in a flat horizontal part with circular recesses on the upper and lower faces thereof, and having formed thereon suitably positioned vertically perforated bosses, a bracket projected from each of the said girders with jaws embracing the sides of the flat part of one of the before mentioned brackets, and having formed at the end of such jaws vertically perforated bosses, suitably shaped blocks of india rubber located in the said recesses and protruding thereout, suitably shaped metal plates across the outer faces of each of the blocks of india rubber and extending across the associated jaws, metal plates extending over the upper ends and lower ends respectively of all the said perforated bosses with corresponding perforations and bolts passing through the perforations in the bosses and plates secured by nuts, a transverse member extending from one girder to the other across the front of the engine, with an eyelet facing the engine in the centre thereof, and a centrally placed horizontal pivot projected from the front of the engine engaging and rocking in the said eyelet.

4. The combination of a self propelled road vehicle having a frame comprising side girders, an engine for propelling the same, and means for mounting the engine on the girders, comprising brackets projected, one on each side, from the engine, each of such brackets terminating in a flat horizontal part with recesses on the upper and lower faces thereof, a like number of brackets projected from the side girders, each formed with jaws embracing respectively the sides of one of the flat parts of the first mentioned brackets, blocks of india rubber located in the said recesses, and protruding thereout, a metal plate positioned across the outer faces of each of the blocks of india rubber, extending across the jaws of the associated bracket projected from a girder, metal plates extending over the upper and lower ends of the brackets and the said jaws, said plates and jaws being bolted together.

In testimony whereof I have hereunto affixed my signature.

FREDERICK HENRY ROYCE.